United States Patent
Maleki et al.

(10) Patent No.: US 12,207,197 B2
(45) Date of Patent: Jan. 21, 2025

(54) METHOD FOR CAUSING A WIRELESS DEVICE TO ENTER A SLEEP STATE BASED ON A GTS INDICATION IN A RECEIVED DCI

(71) Applicant: Telefonaktiebolaget LM Ericsson (publ), Stockholm (SE)

(72) Inventors: Sina Maleki, Malmö (SE); Robert Baldemair, Solna (SE); Ilmiawan Shubhi, Malmö (SE); Andres Reial, Lomma (SE); Pramod Jacob Mathecken, Lomma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 334 days.

(21) Appl. No.: 17/421,631

(22) PCT Filed: Jan. 13, 2020

(86) PCT No.: PCT/SE2020/050023
§ 371 (c)(1),
(2) Date: Jul. 8, 2021

(87) PCT Pub. No.: WO2020/145878
PCT Pub. Date: Jul. 16, 2020

(65) Prior Publication Data
US 2022/0086761 A1    Mar. 17, 2022

Related U.S. Application Data

(60) Provisional application No. 62/791,177, filed on Jan. 11, 2019.

(51) Int. Cl.
*H04W 52/02* (2009.01)
*H04W 72/0446* (2023.01)
*H04W 72/23* (2023.01)

(52) U.S. Cl.
CPC .............. *H04W 52/0235* (2013.01); *H04W 52/0216* (2013.01); *H04W 52/0232* (2013.01); *H04W 72/0446* (2013.01); *H04W 72/23* (2023.01)

(58) Field of Classification Search
CPC ............. H04W 72/23; H04W 52/0235; H04W 52/0216; H04W 72/0446; H04W 52/0229;
(Continued)

(56) References Cited

U.S. PATENT DOCUMENTS

| | | |
|---|---|---|
| 2018/0368112 A1 | 12/2018 | Sebeni et al. |
| 2019/0363843 A1 | 11/2019 | Gordaychik |
| 2020/0092814 A1* | 3/2020 | Zhou ................. H04W 52/0235 |

FOREIGN PATENT DOCUMENTS

| | | |
|---|---|---|
| CN | 105659518 A | 6/2016 |
| CN | 107925964 A | 4/2018 |
| WO | 2019008491 A1 | 1/2019 |

OTHER PUBLICATIONS

International Search Report and Written Opinion dated Apr. 23, 2020 for International Application No. PCT/SE2020/050023, consisting of 14 pages.
(Continued)

*Primary Examiner* — Khalid W Shaheed
(74) *Attorney, Agent, or Firm* — Weisberg I.P. Law, P.A.

(57) ABSTRACT

A system, network node and wireless device a provided. The wireless device receives, during an active time, downlink control information, DCI, having a predefined DCI format from the network node. The predefined DCI format includes at least one bit indicating that the DCI includes a go-to-sleep, GTS, indication. The wireless device is caused to enter a sleep state based at least in part on the GTS indication.

20 Claims, 10 Drawing Sheets

(58) Field of Classification Search
CPC .............. H04W 52/0219; H04W 72/20; H04W 28/18; H04W 72/51; H04W 4/70; H04W 72/04; H04W 24/10; H04W 48/12; H04W 76/28
See application file for complete search history.

(56) References Cited

OTHER PUBLICATIONS

3GPP TSG-RAN WG1 Meeting #90 R1-1714731; Title: WF on power saving physical channel; Source: LG Electronics, ZTE, Sanechips; Agenda Item: Agenda item 5.2.6.2; Location and Date: Prague, Czech Republic, Aug. 21-25, 2017, consisting of 3 pages.
3GPP TSG-RAN WG1 Meeting #94bis R1-1811504; Title: Network impact of NR UE power saving; Agenda Item: 7.2.9.4; Source: Ericsson; Document for: Discussion and Decision; Location and Date: Chengdu, China, Oct. 8-12, 2018, consisting of 4 pages.
3GPP TSG-RAN WG1 Meeting #95 R1-1813183; Title: Triggers of NR UE power saving; Agenda Item: 7.2.9.2.2; Source: Ericsson; Document for: Discussion and Decision; Location and Date: Spokane, USA, Nov. 12-16, 2018, consisting of 5 pages.
European Search Report dated Sep. 5, 2022 for Application No. 20737898.5 consisting of 10 pages.
3GPP TSG RAN WG1 Meeting #94bis R1-1810976; Title: UE adaptation to the traffic for UE power saving; Source: OPPO; Agenda Item: 7.2.9.2.1; Document for: Discussion and Decision; Location and Date: Chengdu, China, Oct. 8-12, 2018, consisting of 8 Pages.
Chinese Office Action and English Summary dated Nov. 18, 2023 for Application No. 202080020329.8, consisting of 21 pages.
3GPP TS 36.211 V15.2.0 3rd Generation Partnership Project; Technical Specification Group Radio Access Network; Evolved Universal Terrestrial Radio Access (E-UTRA); Physical channels and modulation (Release 15); Jun. 2018, consisting of 236 pages.
3GPP TS 36.212 V15.2.0 3rd Generation Partnership Project; Technical Specification Group Radio Access Network; Evolved Universal Terrestrial Radio Access (E-UTRA); Multiplexing and channel coding (Release 15); Jun. 2018, consisting of 245 pages.
3GPP TS 36.213 V12.5.0 3rd Generation Partnership Project; Technical Specification Group Radio Access Network; Evolved Universal Terrestrial Radio Access (E-UTRA); Physical layer procedures (Release 12); Mar. 2015, consisting of 239 pages.
3GPP TS 36.214 V15.2.0 3rd Generation Partnership Project; Technical Specification Group Radio Access Network; Evolved Universal Terrestrial Radio Access (E-UTRA); Physical layer Measurements (Release 15); Jun. 2018, consisting of 24 pages.
3GPP TS 38.213 V15.3.0 3rd Generation Partnership Project; Technical Specification Group Radio Access Network; NR; Physical layer procedures for control (Release 15); Sep. 2018, consisting of 101 pages.
3GPP TS 38.214 V15.3.0 3rd Generation Partnership Project; Technical Specification Group Radio Access Network; NR; Physical layer procedures for data (Release 15); Sep. 2018, consisting of 96 pages.

* cited by examiner

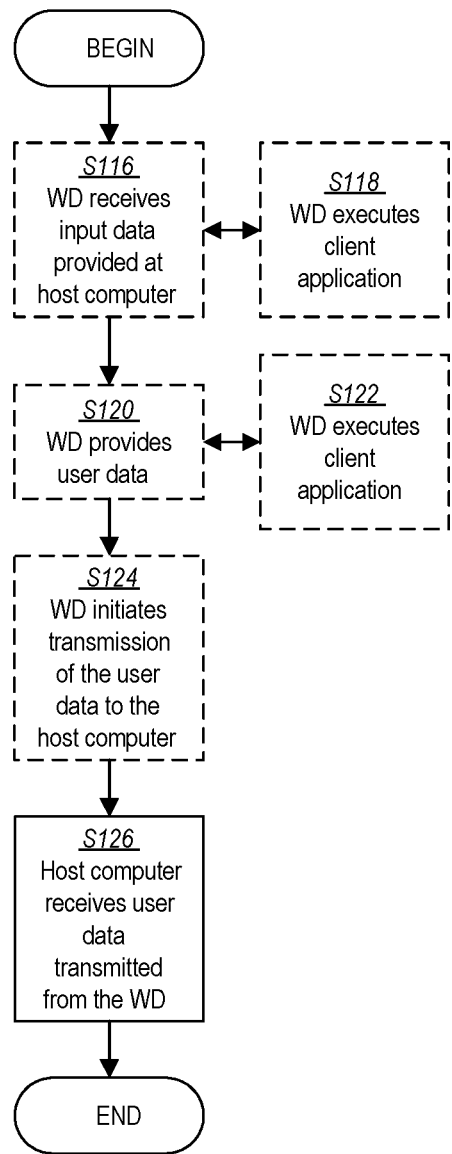
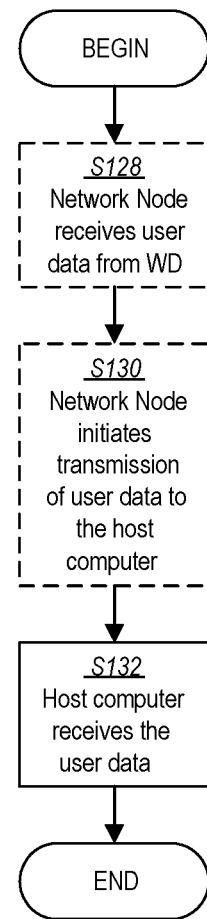
FIG. 8
FIG. 9

METHOD FOR CAUSING A WIRELESS DEVICE TO ENTER A SLEEP STATE BASED ON A GTS INDICATION IN A RECEIVED DCI

CROSS-REFERENCE TO RELATED APPLICATIONS

This application is a Submission Under 35 U.S.C. § 371 for U.S. National Stage Patent Application of International Application No.: PCT/SE2020/050023, filed Jan. 13, 2020 entitled "METHOD FOR CAUSING A WIRELESS DEVICE TO ENTER A SLEEP STATE BASED ON A GTS INDICATION IN A RECEIVED DCI," which claims priority to U. S. Provisional Application No.: 62/791,177, filed Jan. 11, 2019, entitled "GO-TO-SLEEP SIGNAL DESIGN DURING ON DURATION OF A CONNECTED DISCONTINUOUS RECEPTION" the entireties of both of which are incorporated herein by reference.

TECHNICAL FIELD

The present disclosure relates to wireless communications between a network node and a wireless device, and in particular, to providing control information, e.g., DCI, to indicate, at the DCI level, for the wireless device to enter a discontinuous reception, DRX, sleep mode.

BACKGROUND

The New Radio (NR) standard in Third Generation Partnership Project (3GPP) (also referred to as "5G") is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service may require a low latency and high reliability transmission but perhaps for moderate data rates.

One of the existing solutions for low latency data transmission is shorter transmission time intervals. In 3GPP NR, in addition to transmission in a slot, a mini-slot transmission is also allowed to reduce latency. A mini-slot (in NR terminology called Type B scheduling) may consist of any number of 1 to 14 Orthogonal Frequency-Division Multiplexing (OFDM) symbols in the Uplink (UL) and 2, 4 or 7 symbols in the Downlink (DL) (in 3GPP Rel-15). FIG. 1 is an example of a radio resource in NR. It is noted that the concepts of slot and mini-slot are not specific to a specific service meaning that a mini-slot may be used for either eMBB, URLLC, or other services.

Physical Channels

A downlink physical channel corresponds to a set of resource elements carrying information originating from higher layers. The following downlink physical channels are defined:
Physical Downlink Shared Channel, PDSCH.
Physical Broadcast Channel, PBCH.
Physical Downlink Control Channel, PDCCH.
PDSCH is the main physical channel used for unicast downlink data transmission, but also for transmission of RAR (Random Access Response), certain system information blocks, and paging information. Physical Broadcast Channel (PBCH) carries the basic system information, required by the wireless device to access the network and to read remaining system information in System Information Block Type 1 (SIB1). PDCCH is used for transmitting downlink control information (DCI), mainly scheduling decisions, required for reception of PDSCH, and for uplink scheduling grants enabling transmission on Physical Uplink Shared Channel (PUSCH).

An uplink physical channel corresponds to a set of resource elements carrying information originating from higher layers. The following uplink physical channels are defined:
Physical Uplink Shared Channel, PUSCH.
Physical Uplink Control Channel, PUCCH.
Physical Random Access Channel, PRACH.
PUSCH is the uplink counterpart to the PDSCH. PUCCH is used by wireless devices to transmit uplink control information, including Hybrid Automatic Repeat Request (HARQ) acknowledgments, channel state information reports, etc. Physical Random Access Channel (PRACH) is used for random access preamble transmission.

An example contents of a DL Downlink Control Information (DCI) 1-0 is shown below.

Example Contents of a DCI Format 1_0 with CRC Scrambled by C-RNTI/CS_RNTI

Identifier for DCI formats—1 bit
The value of this bit field may always be set to 1, indicating a DL DCI format
Frequency domain resource assignment—$\lceil \log_2(N_{RB}^{DL,BWP}(N_{RB}^{DL,BWP}+1)/2)\rceil$ bits
$N_{RB}^{DL,BWP}$ is the size of the active DL bandwidth part in case DCI format 1_0 is monitored in the wireless device specific search space and satisfying:
the total number of different DCI sizes configured to monitor is no more than 4 for the cell, and
the total number of different DCI sizes with C-RNTI configured to monitor is no more than 3 for the cell;
otherwise, $N_{RB}^{DL,BWP}$ is the size of ControlResourceSet (CORESET) 0.
Time domain resource assignment—4 bits as defined in 3GPP such as in Subclause 5.1.2.1 of 3GPP TS 38.214
VRB-to-PRB mapping—1 bit according to 3GPP such as Table 7.3.1.1.2-33 in 3GPP TS 38.214;
Modulation and coding scheme—5 bits as defined in 3GPP such as in Subclause 5.1.3 of 3GPP TS 38.214;
New data indicator—1 bit
Redundancy version—2 bits as defined in 3GPP such as in Table 7.3.1.1.1-2 of 3GPP TS 38.214;
HARQ process number—4 bits
Downlink assignment index (DAI)—2 bits as defined in 3GPP such as in Subclause 9.1.3 of 3GPP TS 38.213, as counter DAI;
Transmit Power Control (TPC) command for scheduled PUCCH—2 bits as defined in 3GPP such as in Subclause 7.2.1 of 3GPP TS 38.213;
PUCCH resource indicator—3 bits as defined in 3GPP such as in Subclause 9.2.3 of 3GPP TS 38.213;
PDSCH-to-HARQ_feedback timing indicator—3 bits as defined in 3GPP such as in Subclause 9.2.3 of 3GPP TS38.213.

A wireless device in NR operates in various Radio Resource Control (RRC) modes; RRC_IDLE, RRC_INACTIVE, and RRC_CONNECTED mode. One activity for a wireless device in RRC_CONNECTED mode is monitoring the PDCCH for potentially scheduled data on a PDSCH/PUSCH by the network and/or network node.

During this activity, a wireless device may need to receive and decode received data in all PDCCH occasions/Time- Frequency(TF) locations/configurations according to a configured search space. The decoding process, also called blind decoding (BD), entails searching for various Downlink Control Information (DCI) commands potentially present on the PDCCH channel and addressed to the wireless device based on checking the Cyclic Redundancy Check (CRC) using its Cell Radio Network Temporary Identifier (C-RNTI) (but also other RNTIs if configured such MCS-RNTI, CS-RNTI, and various system wide RNTIs). In case the wireless device finds a DCI command including information about allocated data on the PDSCH in the same slot or in an upcoming slot depending on the K0 configuration, the wireless device attempts to decode the PDSCH. K0=0 means the data is scheduled in the same slot while K0>0 indicates cross-slot scheduling. K0 may be the time offset (in slots) between the DCI command and the allocated data on PDSCH.

Connected-Discontinuous Reception (C-DRX) mechanism enables putting the wireless device in a low-power mode for a considerably large fraction of the time when no traffic is transmitted to the wireless device. According to a configured periodicity, the wireless device "wakes up" to monitor the PDCCH which may or may not include an allocation. The period during which the wireless device is awake and monitoring PDCCH is called On-Duration. In case of any DL/UL allocation found during the On-Duration, the wireless device is kept awake for a period of time (Inactivity Timer running) during which it constantly monitors PDCCH. If the wireless device is not allocated any data during this time, the wireless device goes back to discontinuous operation, again waking up occasionally during On-Durations. C-DRX is depicted in FIG. 2. Typically, the DRX parameters are configured by RRC and there are some other DRX parameters including Round Trip Time (RTT) related, HARQ related, etc. On duration and the time duration when inactivity timer is running is also generally referred to as active time.

In general, the following terms are typically associated with DRX operation:
Active Time: Time related to DRX operation, during which the MAC entity monitors the PDCCH.
DRX Cycle: Specifies the periodic repetition of the On Duration followed by a possible period of inactivity (as illustrated in FIG. 2).
Inactivity Timer: Generally, refers to the number of consecutive PDCCH-subframe(s)/slots after the subframe/slot in which a PDCCH indicates an initial UL, DL or sidelink (SL) user data transmission for a MAC entity.
MAC entity is the medium access control entity, and there is one MAC entity per configured cell group, for example the master cell group and secondary cell group.

One aspect of DRX is that DRX functionality is configured by RRC, which is typically operating on a slower scale than MAC or Physical layer. Thus, the DRX parameter settings, etc., cannot be changed quite adaptively through RRC configuration, especially if the wireless device has a mix of traffic types.

SUMMARY

Some embodiments advantageously provide methods, systems, network nodes and wireless devices for providing control information, e.g., DCI, to indicate, at the DCI level, for a wireless device to enter a discontinuous reception, DRX, mode, i.e., based at least in part on the DCI format According to one aspect of the disclosure, a wireless device is provided. The wireless device includes processing circuitry configured to: receive, during an active time, downlink control information, DCI, having a predefined DCI format where the predefined DCI format includes at least one bit indicating that the DCI includes a go-to-sleep, GTS, indication, and cause the wireless device to enter a sleep state based at least in part on the GTS indication.

According to one or more embodiments of this aspect, the at least one bit indicates that a bit field in the predefined DCI format is a repurposed bit field where the repurposed bit field indicates that the DCI includes the GTS indication. According to one or more embodiments of this aspect, the bit field corresponds to a reserved bit field in the predefined DCI format. According to one or more embodiments of this aspect, the bit field is a modulation and coding scheme, MCS, indication field where the at least one bit is one of: a bit pattern that fails to map to a valid scheduling configuration, and a plurality of bits that map to an invalid index.

According to one or more embodiments of this aspect, the at least one bit is a bit combination that corresponds to a reserved index. According to one or more embodiments of this aspect, the bit field corresponds to a plurality of padding bits. According to one or more embodiments of this aspect, the DCI further indicates for the wireless device to enter the sleep state after an indicated quantity of slots or after an indicated time duration. According to one or more embodiments of this aspect, the processing circuitry is further configured to, in response to receiving the DCI, configure a duration of the sleep state before the wireless device returns to monitoring a control channel.

According to one or more embodiments of this aspect, the processing circuitry is further configured to, in response to receiving the DCI, reconfigure at least one connected discontinuous reception, C-DRX, configuration. According to one or more embodiments of this aspect, the processing circuitry is further configured to, in response to receiving the DCI, trigger reception of a physical downlink shared channel, PDSCH, transmission that includes additional information for configuring the sleep state. According to one or more embodiments of this aspect, the processing circuitry is further configured to, in response to receiving the DCI, cause the wireless device to enter the sleep state after the additional information has been received. According to one or more embodiments of this aspect, the processing circuitry is further configured to, in response to receiving the DCI, cause the wireless device to skip a quantity of physical downlink control channel, PDCCH, monitoring occasions. According to one or more embodiments of this aspect, the DCI format is a format other than DCI format 1-0, DCI format 1-1, DCI format 0-0 and DCI format 0-1.

According to another aspect of the disclosure, a method implemented by a wireless device is provided. In the method, the wireless device receives, during an active time, downlink control information, DCI, having a predefined DCI format where the predefined DCI format includes at least one bit indicating that the DCI includes a go-to-sleep, GTS, indication. The wireless device is caused to enter a sleep state based at least in part on the GTS indication.

According to one or more embodiments of this aspect, the at least one bit indicates that a bit field in the predefined DCI format is a repurposed bit field, the repurposed bit field indicating that the DCI includes the GTS indication. According to one or more embodiments of this aspect, the bit field corresponds to a reserved bit field in the predefined DCI format. According to one or more embodiments of this aspect, the bit field is a modulation and coding scheme, MCS, indication field, the at least one bit being one of: a bit pattern that fails to map to a valid scheduling configuration, and a plurality of bits that map to an invalid index.

According to one or more embodiments of this aspect, the at least one bit is a bit combination that corresponds to a reserved index. According to one or more embodiments of this aspect, the bit field corresponds to a plurality of padding bits. According to one or more embodiments of this aspect, the DCI further indicates for the wireless device to enter the sleep state after an indicated quantity of slots or after an indicated time duration. According to one or more embodiments of this aspect the method further comprises, in response to receiving the DCI, configuring a duration of the sleep state before the wireless device returns to monitoring a control channel.

According to one or more embodiments of this aspect the method further comprises, in response to receiving the DCI, reconfiguring at least one connected discontinuous reception, C-DRX, configuration. According to one or more embodiments of this aspect the method further comprises, in response to receiving the DCI, triggering reception of a physical downlink shared channel, PDSCH, transmission where the PDSCH transmission includes additional information for configuring the sleep state. According to one or more embodiments of this aspect, in response to receiving the DCI, the wireless device is caused to enter the sleep state after the additional information has been received. According to one or more embodiments of this aspect the method further comprises, in response to receiving the DCI, skipping a quantity of physical downlink control channel, PDCCH, monitoring occasions. According to one or more embodiments of this aspect, the DCI format is a format other than DCI format 1-0, DCI format 1-1, DCI format 0-0 and DCI format 0-1.

According to another aspect of the disclosure, a network node is provided. The network node includes processing circuitry configured to: configure downlink control information, DCI, having a predefined DCI format where the predefined DCI format includes at least one bit indicating that the DCI includes a go-to-sleep, GTS, indication configured to be received by a wireless device during an active time and to cause the wireless device to enter a sleep state, and cause transmission of the DCI to the wireless device.

According to one or more embodiments of this aspect, the at least one bit indicates that a bit field in the predefined DCI format is a repurposed bit field, the repurposed bit field indicating that the DCI includes the GTS indication. According to one or more embodiments of this aspect, the bit field corresponds to a reserved bit field in the predefined DCI format. According to one or more embodiments of this aspect, the bit field is a modulation and coding scheme, MCS, indication field, the at least one bit being one of: a bit pattern that fails to map to a valid scheduling configuration, and a plurality of bits that map to an invalid index. According to one or more embodiments of this aspect, the at least one bit is a bit combination that corresponds to a reserved index. According to one or more embodiments of this aspect, the bit field corresponds to a plurality of padding bits.

According to one or more embodiments of this aspect, the processing circuitry is further configured to configure the DCI to cause the wireless device to enter the sleep state after an indicated quantity of slots or after an indicated time duration. According to one or more embodiments of this aspect, the processing circuitry is further configured to configure the DCI to cause the wireless device to configure a duration of the sleep state before the wireless device returns to monitoring a control channel. According to one or more embodiments of this aspect, the processing circuitry is further configured to configure the DCI to cause the wireless device to reconfigure at least one connected discontinuous reception, C-DRX, configuration of the wireless device.

According to one or more embodiments of this aspect, the processing circuitry is further configured to cause a physical downlink shared channel, PDSCH, transmission that includes additional information for the wireless device to configure the sleep state. According to one or more embodiments of this aspect, the processing circuitry is configured to configure the DCI to cause the wireless device to enter the sleep state after the additional information has been received. According to one or more embodiments of this aspect, the processing circuitry is further configured to configure the DCI to cause the wireless device to skip a quantity of PDCCH monitoring occasions. According to one or more embodiments of this aspect, the DCI format is a format other than DCI format 1-0, DCI format 1-1, DCI format 0-0 and DCI format 0-1.

According to another aspect of the disclosure, a method implemented by a network node is provided. In the method, the network node configures downlink control information, DCI, having a predefined DCI format where the predefined DCI format includes at least one bit indicating that the DCI includes a go-to-sleep, GTS, indication configured to be received by a wireless device during an active time and to cause the wireless device to enter a sleep state. The network node is caused to transmit the DCI to the wireless device.

According to one or more embodiments of this aspect, the at least one bit indicates that a bit field in the predefined DCI format is a repurposed bit field where the repurposed bit field indicates that the DCI includes the GTS indication. According to one or more embodiments of this aspect, the bit field corresponds to a reserved bit field in the predefined DCI format. According to one or more embodiments of this aspect, the bit field is a modulation and coding scheme, MCS, indication field, the at least one bit being one of: a bit pattern that fails to map to a valid scheduling configuration; and a plurality of bits that map to an invalid index. According to one or more embodiments of this aspect, the at least one bit is a bit combination that corresponds to a reserved index. According to one or more embodiments of this aspect, the bit field corresponds to a plurality of padding bits.

According to one or more embodiments of this aspect, configuring the DCI further comprises configuring the DCI to cause the wireless device to enter the sleep state after an indicated quantity of slots or after an indicated time duration. According to one or more embodiments of this aspect, configuring the DCI further comprises configuring the DCI to cause the wireless device to configure a duration of the sleep state before the wireless device returns to monitoring a control channel.

According to one or more embodiments of this aspect, configuring the DCI further comprises configuring the DCI to cause the wireless device to reconfigure at least one connected discontinuous reception, C-DRX, configuration of the wireless device. According to one or more embodiments of this aspect, the method further comprises causing a physical downlink shared channel, PDSCH, transmission that includes additional information for the wireless device to configure the sleep state. According to one or more embodiments of this aspect, configuring the DCI comprises configuring the DCI to cause the wireless device to enter the sleep state after the additional information has been received. According to one or more embodiments of this aspect, configuring the DCI comprises configuring the DCI to cause the wireless device to skip a quantity of PDCCH monitoring occasions. According to one or more embodiments of this aspect, the DCI format is a format other than DCI format 1-0, DCI format 1-1, DCI format 0-0 and DCI format 0-1.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 8 is a flowchart illustrating exemplary methods implemented in a communication system including a host computer, a network node and a wireless device for receiving user data from the wireless device at a host computer according to some embodiments of the present disclosure;

FIG. 9 is a flowchart illustrating exemplary methods implemented in a communication system including a host computer, a network node and a wireless device for receiving user data at a host computer according to some embodiments of the present disclosure;

DETAILED DESCRIPTION

As discussed above, existing DRX, such as C-DRX operation, is configured by RRC. In existing 3GPP specifications, the network node and/or network (NW) has the possibility to provide a Go-To-Sleep (GTS) signal called Medium Access Control (MAC) Control Element (CE) DRX-Command in the PDSCH in order to put the wireless device back in C-DRX mode after the transmission is ended. As such, the network and/or network node manages and/or causes the transition of the wireless device to the sleep mode, also denoted sleep state herein, faster than the time it would have taken the Inactivity Timer to expire in which expiration of the timer causes the wireless device to enter the sleep mode.

A Wake-Up-Signal (WUS) has been employed in Narrowband Internet of Things (NB-IoT) and Long Term Evolution Machine Type Communication (LTE-MTC (LTE-M)), e.g., to wake up the wireless device ahead of paging occasions in idle. In NB-IoT and LTE-M, a Zadoff-Chu (ZC) based sequence is used as the WUS. When the WUS is configured in a cell, and the wireless device supports the operation of WUS, the wireless device first detects the WUS prior its paging occasion (PO). If WUS is detected, the wireless device proceeds to decoding the paging DCI. If the WUS is not detected, the wireless device goes back to sleep. As WUS is significantly shorter than the paging DCI, the use of WUS saves wireless device power, as the expected paging load in NB-IoT and LTE-M is low.

During an existing study of WUS in NB-IoT and LTE-M, the concept of using a compact DCI was also proposed. That is to use a DCI smaller than the regular paging DCI with the expectation that the compact DCI can be decoded within a shorter time, and therefore saves the wireless device energy. But as the energy saving performance of compact DCI was not desirable such that the idea of using the compact DCI was not pursued in the study in NB-IoT and LTE-M.

Wireless device power consumption is an important metric that may need to be enhanced. In general, significant power can be spent on monitoring the PDCCH in LTE based on one DRX setting from LTE field logs. The situation can be similar in NR if similar DRX setting with traffic modeling is utilized, as the wireless device may need to perform blind detection in its configured search space to identify whether there is a PDCCH sent to it, and act accordingly. Techniques that can reduce unnecessary PDCCH monitoring or that allow the wireless device to go to sleep or wake-up only when required can be beneficial.

Figure 1:
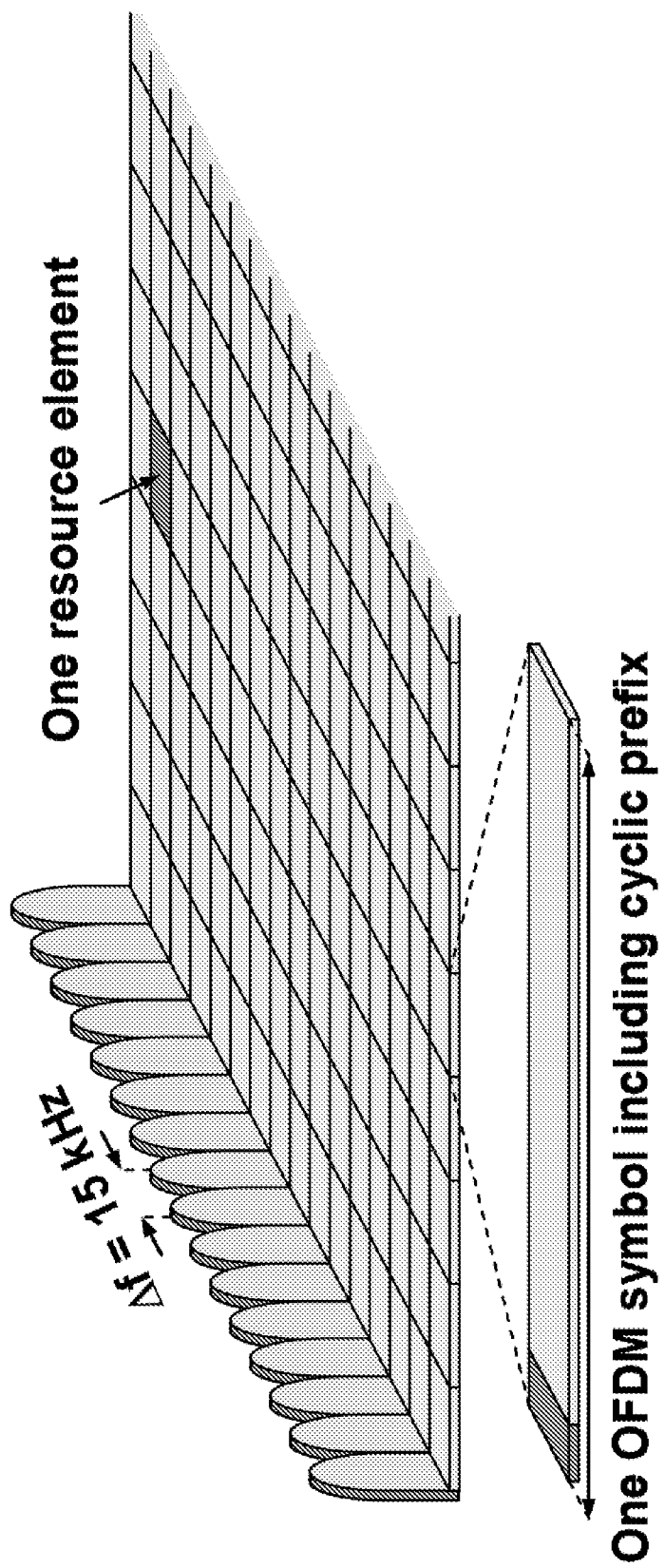
FIG. 1 is a diagram of a radio resource in 3GPP NR.
Figure 2:
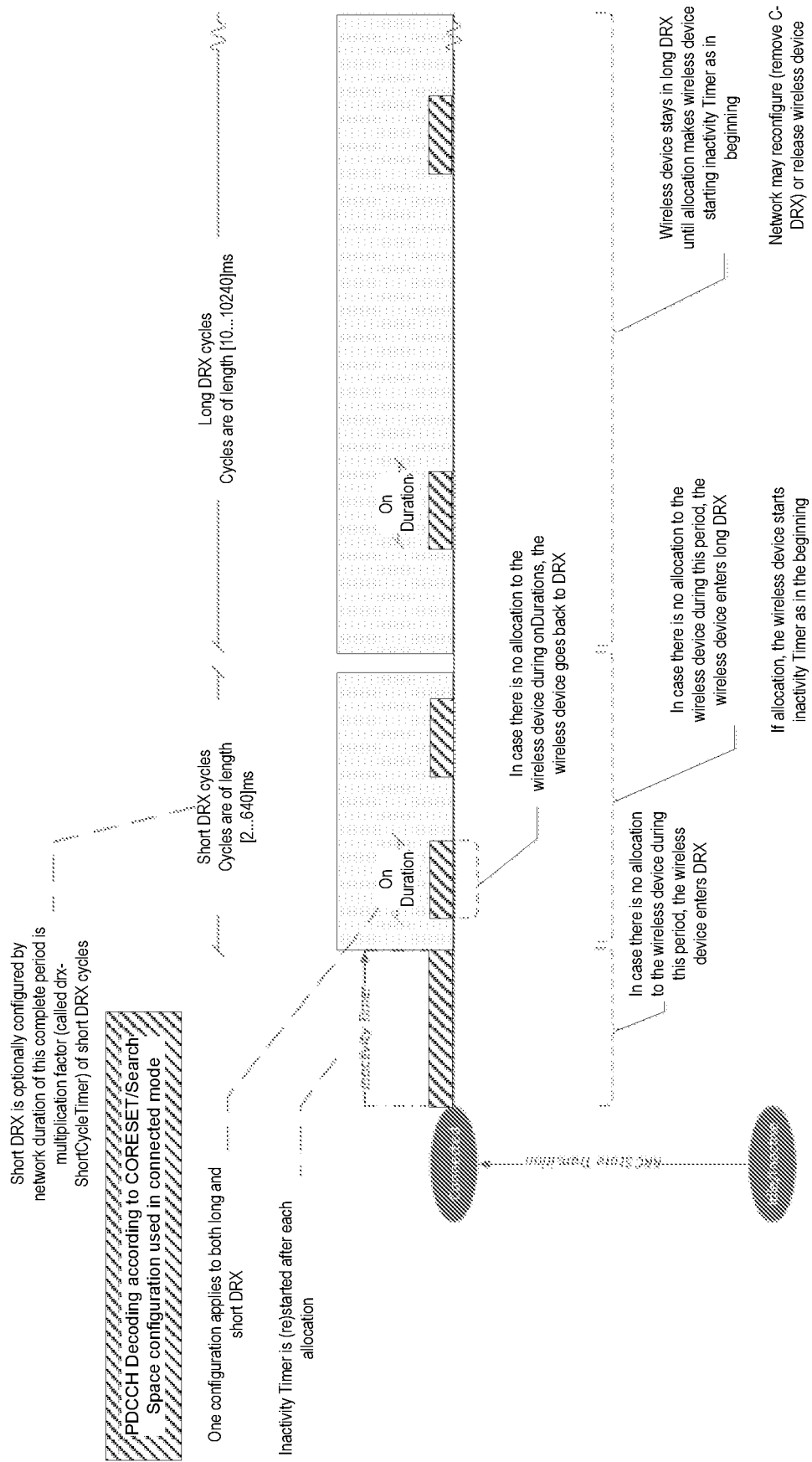
FIG. 2 is a timing diagram of Connected-DRX (C-DRX) operation in 3GPP.
Figure 3:
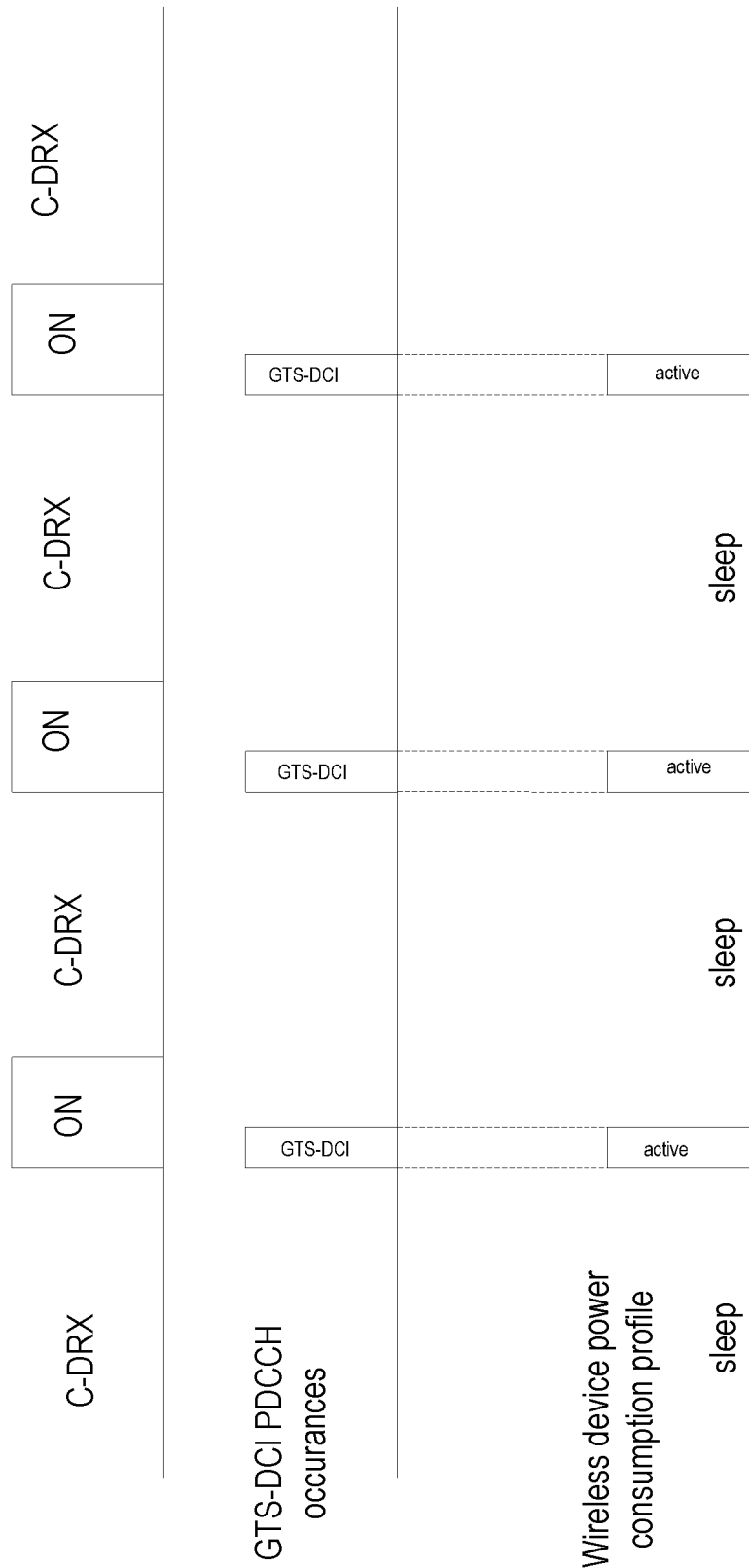
FIG. 3 is a diagram of a schematic description of GTS-DCI mechanism for wireless device power savings.

In one example, a GTS-DCI mechanism is provided to put the wireless device into sleep mode during the ON duration of DRX mechanism, if it turns out that no DL or UL is scheduled for the wireless device, or planned to be scheduled over the rest of the ON duration. FIG. 3 describes this scheme. An advantage is to reduce the number of dummy PDCCH monitoring instances and thereby achieve energy savings in the wireless device.

The time diagram in FIG. 3 shows an example of how the GTS-DCI disrupts the ON duration to avoid the wireless device monitoring of the dummy PDCCH. In this manner, the wireless device may save some of its energy leading to a longer lifetime.

The disclosure provides mechanisms for designing GTS-DCI payload for the GTS mechanism during the ON duration or the inactivity timer of the wireless device.

The methods and mechanisms accommodate the GTS-DCI payload including the GTS indication and optional command part in two ways:

(1) The GTS-DCI payload is included as part of the established scheduling DCI formats, i.e., 0-0, 0-1, 1-0, and 1-1, e.g., using reserved bits or by redefining existing fields contents or payload bit interpretations.

(2) A new DCI format is established which includes the GTS-DCI payload. The second approach can be used, e.g., when the GTS-DCI payload cannot be included in the established scheduling DCI formats.

The disclosure further presents how additional configurations and parameters, e.g., GTS delay and duration or C-DRX reconfiguration, can be provided together with GTS transmission. The additional information can be included in the DCI, and if there is no space, can be sent within PDSCH.

The solution is particularly of benefit to the network node/network and wireless device because from one aspect, the arrangement utilizes the existing PDCCH DCI formats. Therefore, there is not much extra cost to the network/network node and wireless device to implement the mechanisms described herein. In cases where the current, i.e., known, DCI formats are used, the network and/or network node does not even need additional signaling. Therefore, the signaling overhead of the arrangement described herein is very minimal as compared with existing implementations. Arrangements described herein also extend the existing mechanism beyond simply sending the wireless device to sleep by leveraging possible additional information.

Before describing in detail exemplary embodiments, it is noted that the embodiments reside primarily in combinations of apparatus components and processing steps related to providing control information, e.g., DCI, to indicate, at the DCI level, for a wireless device to enter a discontinuous reception, DRX, mode, i.e., based at least in part on the DCI format. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), gNode B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipment (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU), Remote Radio Head (RRH).

The term resource used herein may correspond to any type of physical resource or radio resource expressed in terms of length of time and/or frequency. Signals are transmitted or received by a radio node over a time resource. Examples of time resources are: symbol, time slot, subframe, radio frame, Transmission Time Interval (TTI), interleaving time, etc.

An indication generally may explicitly and/or implicitly indicate the information it represents and/or indicates. Implicit indication may for example be based on position and/or resource and/or format, i.e., DCI format, used for transmission. Explicit indication may for example be based on a parametrization with one or more parameters, and/or one or more index or indices, and/or one or more bit patterns and/or DCI format and/or DCI field/bits representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode, i.e., DRX mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling (DMRS) may in particular comprise DMRS according to NR, 3GPP and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in NR, 3GPP and/or LTE standards. A data transmission may represent and/or pertain to transmission of specific data, e.g., a specific block of data and/or transport block. Generally, demodulation reference signaling may comprise and/or represent a sequence of signals and/or symbols, which may identify and/or define the demodulation reference signaling.

Data and/or information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide control information, e.g., DCI, to indicate, at the DCI level, for a wireless device to enter a discontinuous reception, DRX, mode, i.e., based at least in part on the DCI format.

Figure 4:
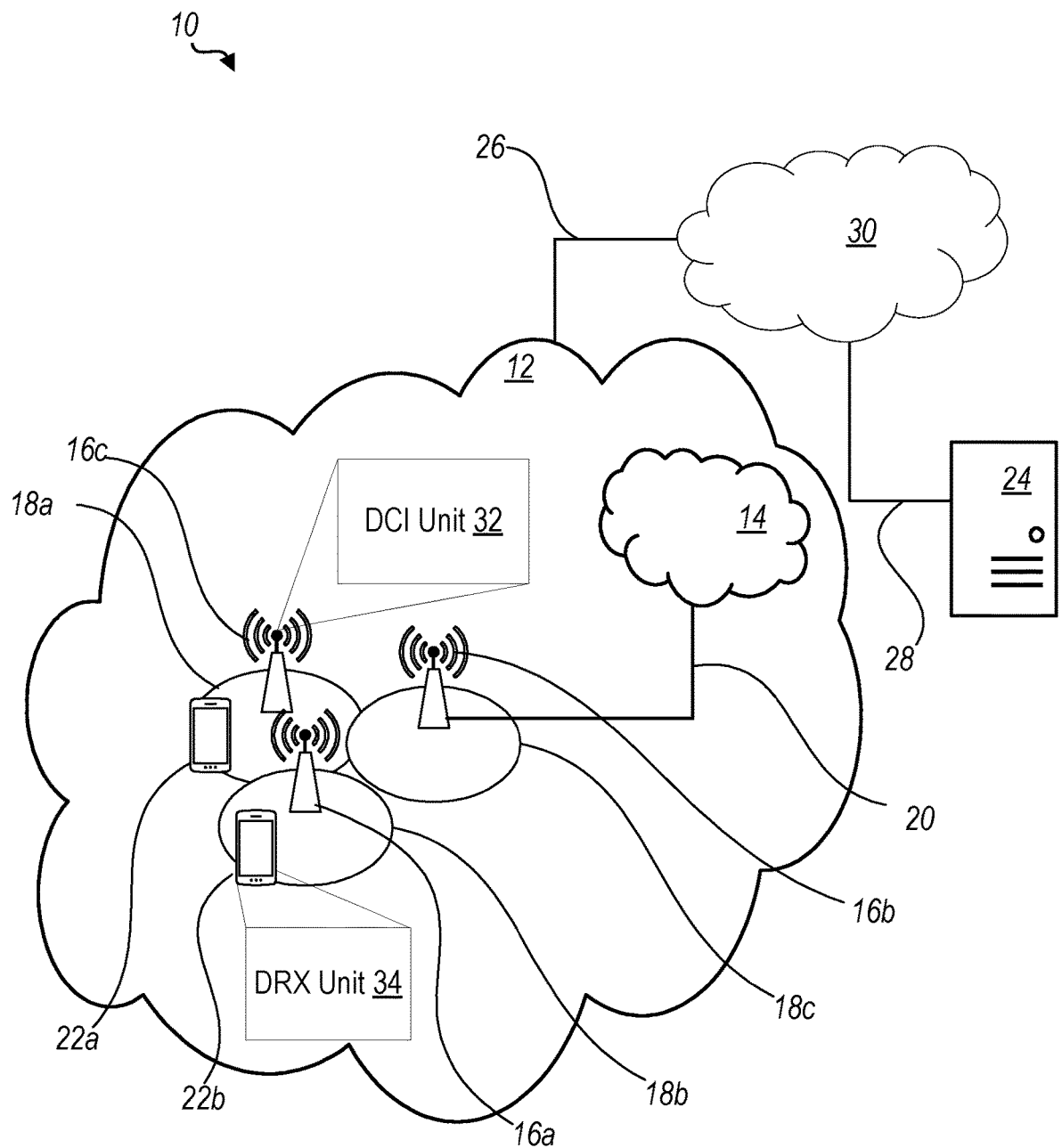
FIG. 4 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a DCI unit 32 which is configured to configure and/or provide control information, e.g., DCI, to indicate for a wireless device to enter a discontinuous reception, DRX, mode, as described herein. A wireless device 22 is configured to include a DRX unit 34 which is configured to receive and/or determine that control information, e.g., DCI, indicates for the wireless device 22 to enter a discontinuous reception, DRX, mode, as described herein.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide, determine, receive, transmit, forward, store, etc., information related to the DCI (i.e., GTS-DCI) described herein.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include DCI unit 32 configured to configure and/or provide control information, e.g., DCI, to indicate for a wireless device to enter a discontinuous reception, DRX, mode, as described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a DRX unit 34 configured to configured to receive and/or determine that control information, e.g., DCI, indicates for the wireless device 22 to enter a discontinuous reception, DRX, mode, as described herein.

Figure 5:
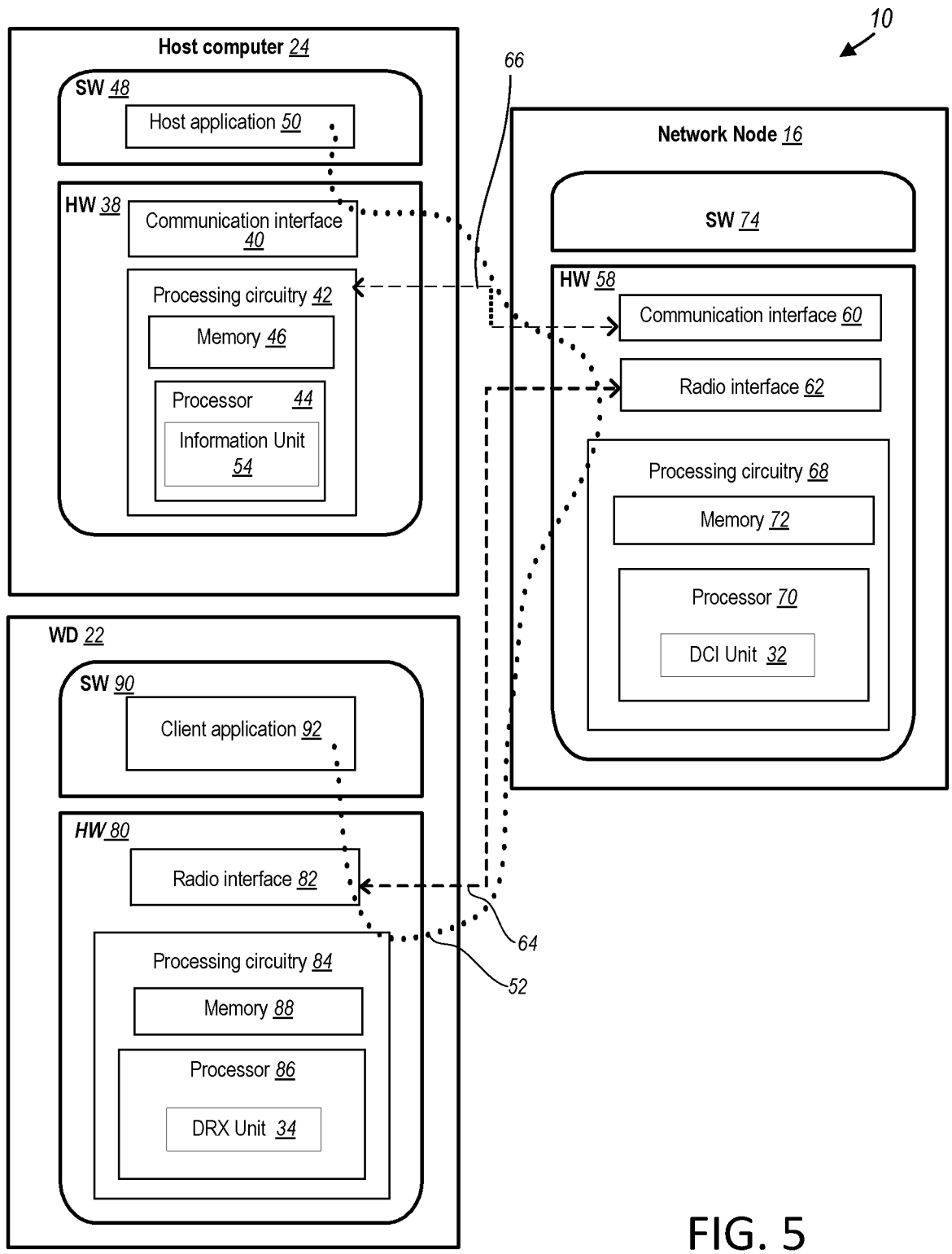
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending receipt of a transmission from the WD 22.

In some embodiments, the host computer 24 includes processing circuitry 42 and a communication interface 40 that is configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending receipt of a transmission from the network node 16.

Although FIGS. 4 and 5 show various "units" such as DCI unit 32, and DRX unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 6, 7:
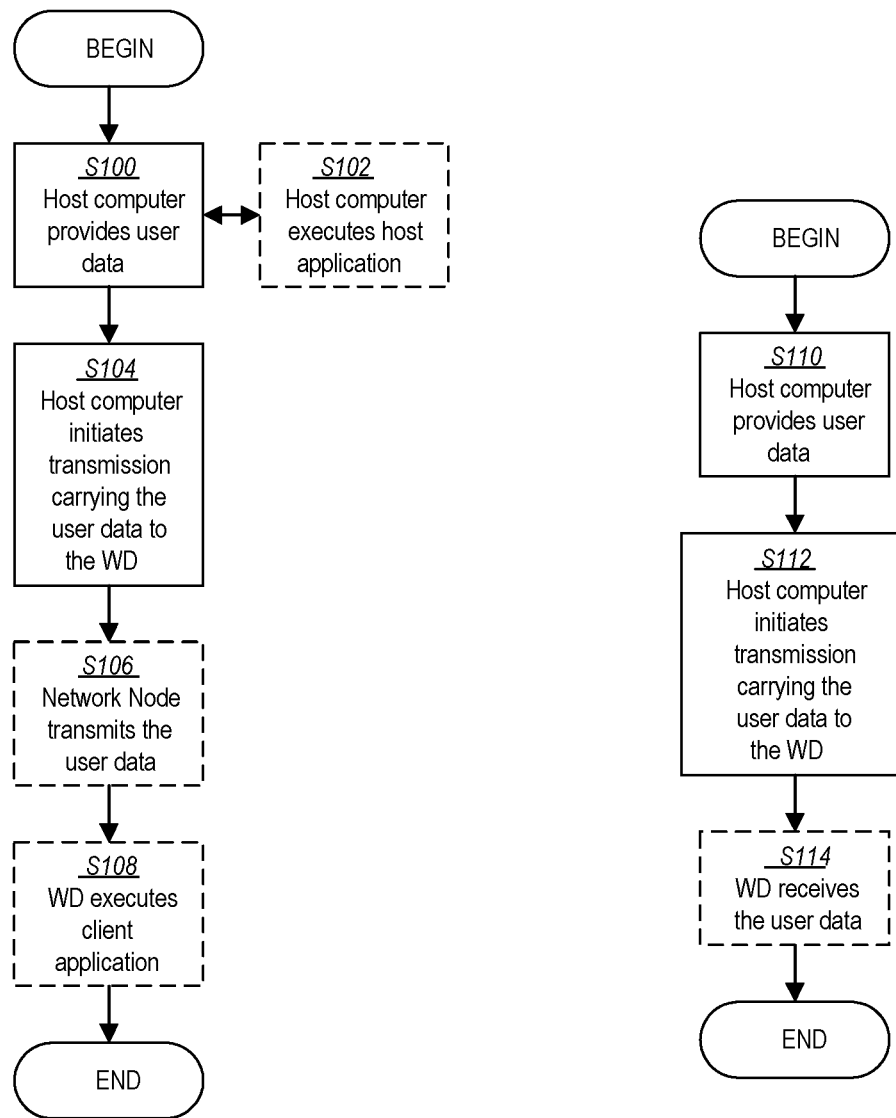
FIG. 6 is a flowchart illustrating exemplary methods implemented in a communication system including a host computer, a network node and a wireless device for executing a client application at a wireless device according to some embodiments of the present disclosure.
FIG. 7 is a flowchart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
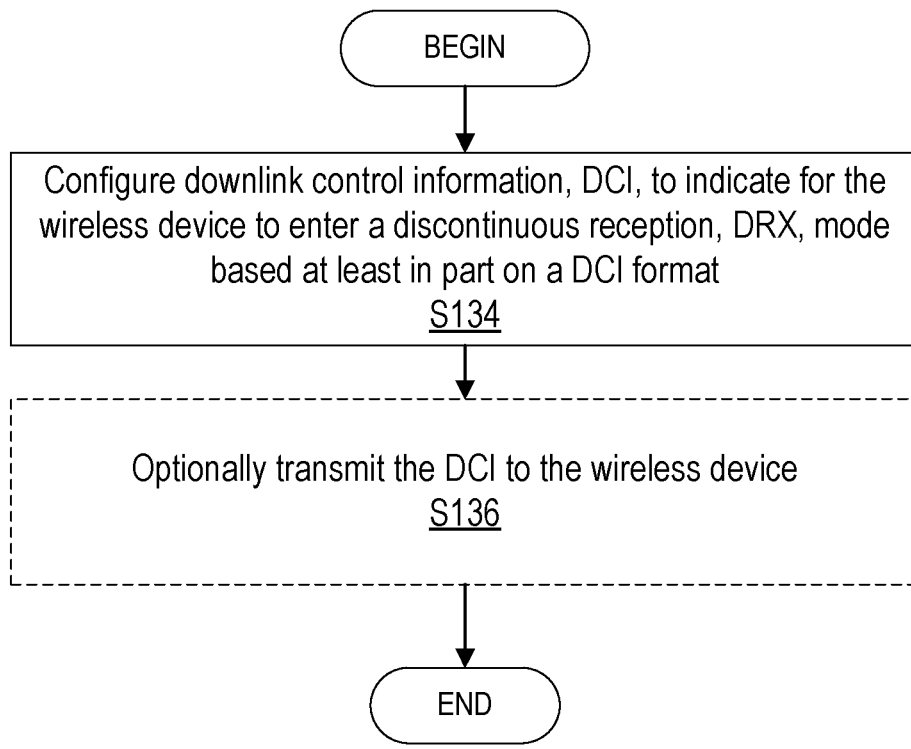
FIG. 10 is a flowchart of an exemplary process in a network node according to some embodiments of the present disclosure.

FIG. 10 is a flowchart of an exemplary process in a network node 16 in accordance with one or more embodiments of the disclosure. One or more Blocks and/or functions performed by network node 16 may be performed by one or more elements of network node 16 such as by DCI unit 32 in processing circuitry 68, processor 70, radio interface 62, etc. In one or more embodiments, network node 16 such as via one or more of processing circuitry 68, processor 70 and radio interface 62 is configured to configure (Block S134) downlink control information, DCI, to indicate for the wireless device 22 to enter a discontinuous reception, DRX, mode based at least in part on a DCI format, as described herein. In one or more embodiments, network node 16 such as via one or more of processing circuitry 68, processor 70 and radio interface 62 is configured to optionally transmit (Block S136) the DCI to the wireless device 22.

According to one or more embodiments, the configured DCI is a go to sleep DCI (GTS-DCI) that uses one of a reserved bit field associated with the GTS-DCI, a reserved index associated with the GTS-DCI and a padding bit or padding bits associated with the GTS-DCI to provide the indication. According to one or more embodiments, the DCI is further configured to provide information associated with at least one of a DRX duration and DRX initiation timing.

Figure 11:
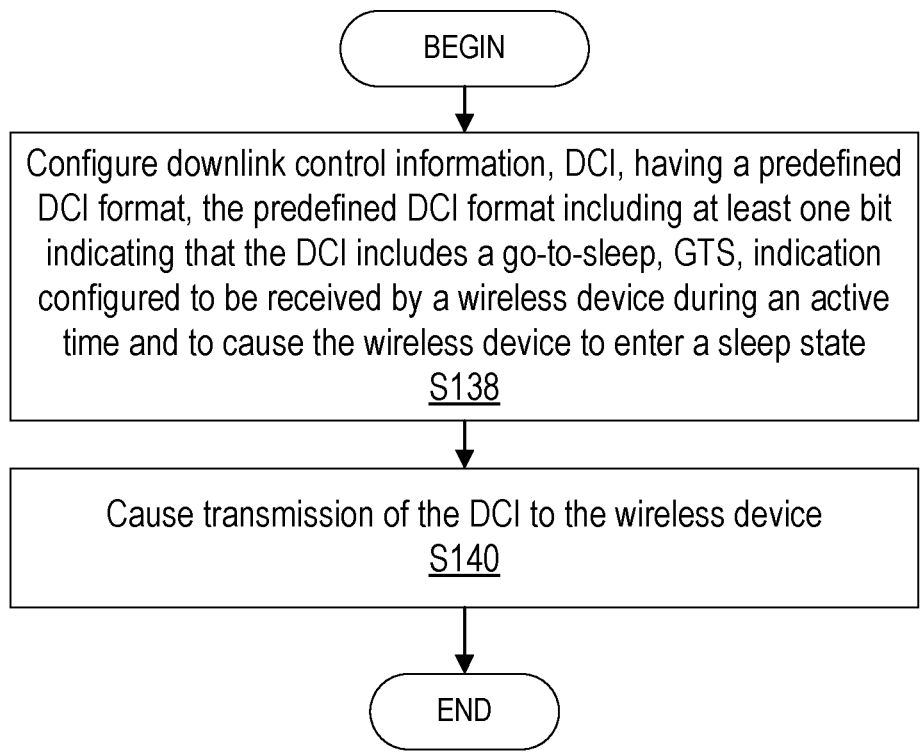
FIG. 11 is a flowchart of another exemplary process in a network node according to some embodiments of the present disclosure.

FIG. 11 is a flowchart of an exemplary process in a network node 16 in accordance with one or more embodiments of the disclosure. One or more Blocks and/or functions performed by network node 16 may be performed by one or more elements of network node 16 such as by DCI unit 32 in processing circuitry 68, processor 70, radio interface 62, etc. In one or more embodiments, network node 16 such as via one or more of processing circuitry 68, processor 70 and radio interface 62 is configured to configure (Block S138) downlink control information, DCI, having a predefined DCI format where the predefined DCI format includes at least one bit indicating that the DCI includes a go-to-sleep, GTS, indication configured to be received by a wireless device during an active time and to cause the wireless device 22 to enter a sleep state, as described herein. In one or more embodiments, network node 16 such as via one or more of processing circuitry 68, processor 70 and radio interface 62 is configured to cause (Block S140) transmission of the DCI to the wireless device 22, as described herein.

According to one or more embodiments, the at least one bit indicates that a bit field in the predefined DCI format is a repurposed bit field, the repurposed bit field indicating that the DCI includes the GTS indication. According to one or more embodiments, the bit field corresponds to a reserved bit field in the predefined DCI format. According to one or more embodiments, the bit field is a modulation and coding scheme, MCS, indication field, the at least one bit being one of: a bit pattern that fails to map to a valid scheduling configuration, and a plurality of bits that map to an invalid index.

According to one or more embodiments, the at least one bit is a bit combination that corresponds to a reserved index. According to one or more embodiments, the bit field corresponds to a plurality of padding bits. According to one or more embodiments, the network node 16 such as via one or more of processing circuitry 68, processor 70 and radio interface 62 is further configured to configure the DCI to cause, or indicate to, the wireless device 22 to enter the sleep state after an indicated quantity of slots or after an indicated time duration. The quantity, e.g. a number, of slots and/or the time duration may be indicated to the wireless device in the DCI, for example in GTS-DCI payload described below. According to one or more embodiments, the network node 16 such as via one or more of processing circuitry 68, processor 70 and radio interface 62 is further configured to configure the DCI to cause the wireless device 22 to configure a duration of the sleep state before the wireless device 22 returns to monitoring a control channel. Thus, at the end of the sleep state according to the configured duration of the sleep state, the wireless device 22 may return to monitoring a control channel.

According to one or more embodiments, the network node 16 such as via one or more of processing circuitry 68, processor 70 and radio interface 62 is further configured to configure the DCI to cause the wireless device 22 to reconfigure at least one connected discontinuous reception, C-DRX, configuration of the wireless device 22. According to one or more embodiments, the network node 16 such as via one or more of processing circuitry 68, processor 70 and radio interface 62 is further configured to cause a physical downlink shared channel, PDSCH, transmission that includes additional information for the wireless device 22 to configure the sleep state. According to one or more embodiments, the network node 16 such as via one or more of processing circuitry 68, processor 70 and radio interface 62 is configured to configure the DCI to cause the wireless device 22 to enter the sleep state after the additional information has been received. According to one or more embodiments, the network node 16 such as via one or more of processing circuitry 68, processor 70 and radio interface 62 is further configured to configure the DCI to cause, or indicate to, the wireless device 22 to skip a quantity of PDCCH monitoring occasions. According to one or more embodiments, the DCI format is a format other than DCI format 1-0, DCI format 1-1, DCI format 0-0 and DCI format 0-1.

Figure 12:
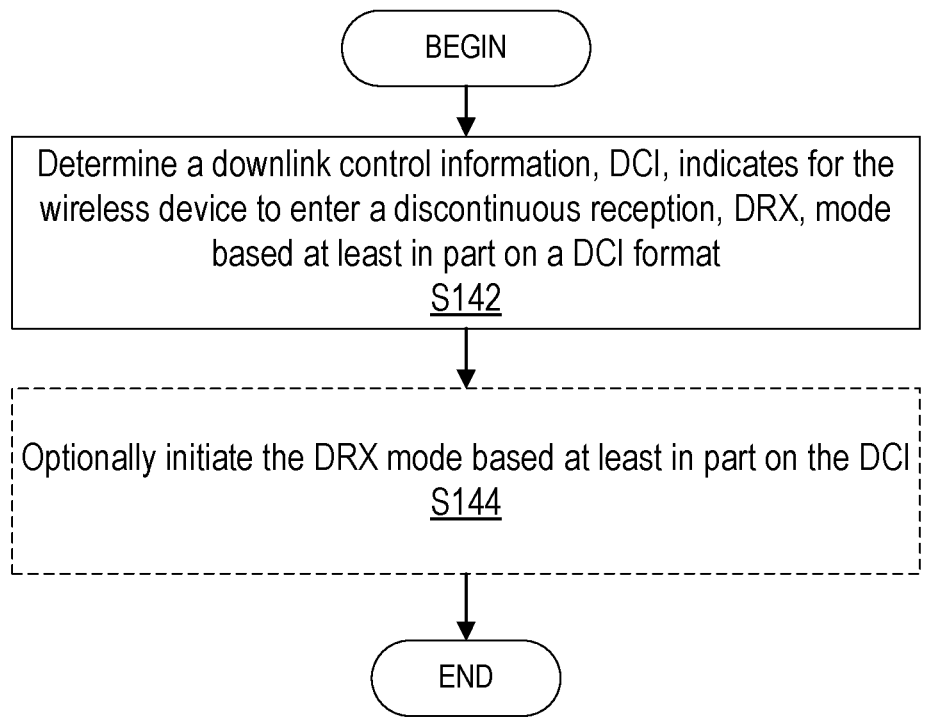
FIG. 12 is a flowchart of an exemplary process in a wireless device according to some embodiments of the present disclosure.

FIG. 12 is a flowchart of an exemplary process in a wireless device 22 according to some embodiments of the present disclosure. One or more Blocks and/or functions performed by wireless device 22 may be performed by one or more elements of wireless device 22 such as by DRX unit 34 in processing circuitry 84, processor 86, radio interface 82, etc. In one or more embodiments, wireless device 22 such as via one or more of processing circuitry 84, processor 86 and radio interface 82 is configured to determine (Block S142) a downlink control information, DCI, indicates for the wireless device to enter a discontinuous reception, DRX, mode based at least in part on a DCI format. In one or more embodiments, wireless device 22 such as via one or more of processing circuitry 84, processor 86 and radio interface 82 is configured to optionally initiate and/or enter (Block S144) the DRX mode based at least in part on the DCI.

According to one or more embodiments, the DCI is a go to sleep DCI (GTS-DCI) that is uses one of a reserved bit field associated with the GTS-DCI, a reserved index associated with the GTS-DCI and padding bits associated with the GTS- DCI to provide the indication. According to one or more embodiments, the DCI is further configured to provide information associated with at least one of a DRX duration and DRX initiation timing.

Figure 13:
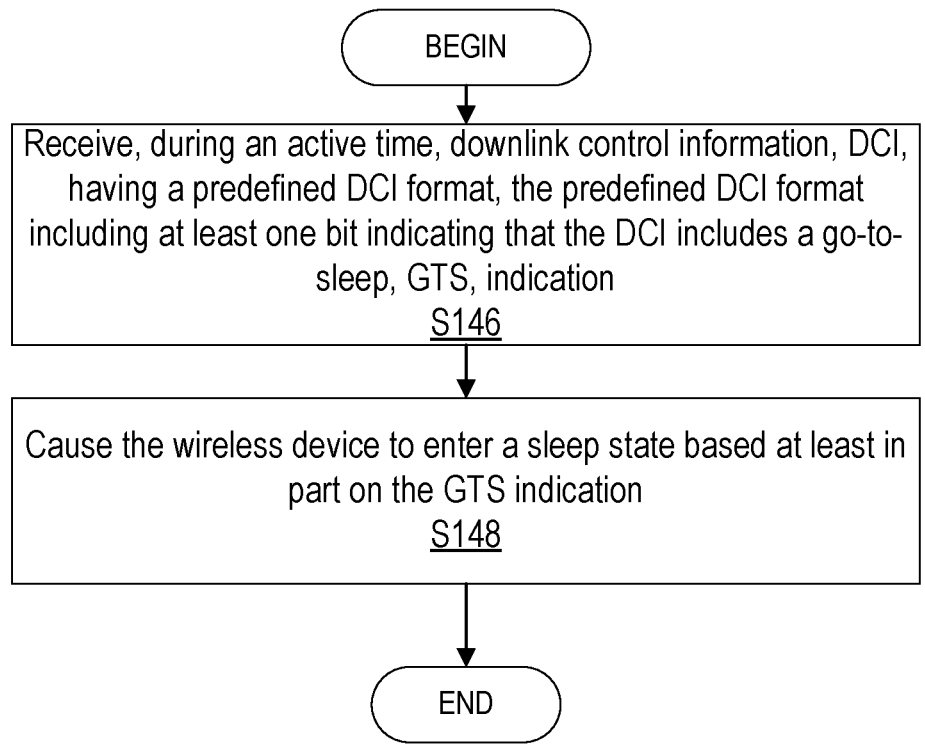
FIG. 13 is a flowchart of another exemplary process in a wireless device according to some embodiments of the present disclosure.

FIG. 13 is a flowchart of another exemplary process in a wireless device 22 according to some embodiments of the present disclosure. One or more Blocks and/or functions performed by wireless device 22 may be performed by one or more elements of wireless device 22 such as by DRX unit 34 in processing circuitry 84, processor 86, radio interface 82, etc. In one or more embodiments, wireless device 22 such as via one or more of processing circuitry 84, processor 86 and radio interface 82 is configured to receive (Block S146), during an active time, downlink control information, DCI, having a predefined DCI format where the predefined DCI format includes at least one bit indicating that the DCI includes a go-to-sleep, GTS, indication, as described herein. In one or more embodiments, wireless device 22 such as via one or more of processing circuitry 84, processor 86 and radio interface 82 is configured to cause (Block S148) the wireless device 22 to enter a sleep state based at least in part on the GTS indication, as described herein.

According to one or more embodiments, the at least one bit indicates that a bit field in the predefined DCI format is a repurposed bit field, the repurposed bit field indicating that the DCI includes the GTS indication. According to one or more embodiments, the bit field corresponds to a reserved bit field in the predefined DCI format. According to one or more embodiments, the bit field is a modulation and coding scheme, MCS, indication field, the at least one bit being one of: a bit pattern that fails to map to a valid scheduling configuration, and a plurality of bits that map to an invalid index.

According to one or more embodiments, the at least one bit is a bit combination that corresponds to a reserved index. According to one or more embodiments, the bit field corresponds to a plurality of padding bits. According to one or more embodiments, the DCI further indicates for the wireless device 22 to enter the sleep state after an indicated quantity of slots or after an indicated time duration. According to one or more embodiments, the processing circuitry 84 is further configured to, in response to receiving the DCI, configure a duration of the sleep state before the wireless device 22 returns to monitoring a control channel. According to one or more embodiments, the processing circuitry 84 is further configured to, in response to receiving the DCI, reconfigure at least one connected discontinuous reception, C-DRX, configuration.

According to one or more embodiments, the processing circuitry 84 is further configured to, in response to receiving the DCI, trigger reception of a physical downlink shared channel, PDSCH, transmission that includes additional information for configuring the sleep state. According to one or more embodiments, the processing circuitry 84 is further configured to, in response to receiving the DCI, cause the wireless device 22 to enter the sleep state after the additional information has been received. According to one or more embodiments, the processing circuitry 84 is further configured to, in response to receiving the DCI, cause the wireless device (22) to skip a quantity of physical downlink control channel, PDCCH, monitoring occasions. According to one or more embodiments, the DCI format is a format other than DCI format 1-0, DCI format 1-1, DCI format 0-0 and DCI format 0-1.

Having generally described arrangements for providing control information, e.g., DCI, to indicate, at the DCI level, for a wireless device 22 to enter a discontinuous reception, DRX, mode, i.e., based at least in part on the DCI format, details for these arrangements, functions and processes are provided as follows, and which may be implemented by the network node 16, wireless device 22 and/or host computer 24.

Embodiments provide a detailed design of a GTS-DCI payload indicating a go to sleep signal to the wireless device 22 at the DCI level, and further including optional additional information or commands.

Several approaches which can be used to design the GTS-DCI signal as described herein. One approach may be implemented both at the network node 16 and wireless device 22 side and may not entail additional signaling as existing DCI formats are used for GTS signaling, i.e., a bit and/or bit field having a specific functional indication is repurposed to provide the GTS indication. In another approach, an independent DCI format is considered for realizing GTS-DCI, i.e., an independent DCI format that is a format other than existing DCI formats (e.g., DCI format 1-0, DCI format 1-1, DCI format 0-0 and DCI format 0-1). The latter involves a minimal one-time signal from the network node 16 to the wireless device 22, however, it can include potentially a larger number of bits and thus larger set of commands in addition to GTS indication as the independent DCI format may not be limited by the number of bits in existing predefined DCI formats.

Figure 14:
FIG. 14 is a diagram of a GTS-DCI payload according to some embodiments of the present disclosure.

Nevertheless, in both cases, as shown in FIG. 14, the GTS-DCI includes the GTS-DCI payload which by itself includes a bit or bit field indicating the GTS signal, and optional more bits indicating some relevant commands, or a set of commands, e.g., the number of slots after which the wireless device 22 can go to sleep, or for how long to sleep and so on. Note that the command part does not necessarily appear immediately after GTS indication, and can be located in different locations either within the same DCI, another DCI or even PDSCH. It is also possible to map the indication or commands to some other index rows related to other indications within the DCI formats. Further, in one or more embodiments, both the wireless device 22 and network node 16 may operate according to the same C-DRX configurations. In one or more embodiments, reconfiguration of a C-DRX configuration may correspond to both the wireless device 22 and network node 16 reconfiguring their respective C-DRX configurations in unison where such configurations may be stored in respective memory 72/88.

GTS-DCI Design

Based on Existing Scheduling DCI Formats:

According to one or more embodiments, one of the ways of designing a GTS-DCI is to use the reserved bits or other kind of indications in the current/existing scheduling DCI formats during PDCCH monitoring occasions. Below is an outline of some examples.

DCI Format 1-0:

In case the DCI is wireless device 22 specific, e.g., it is CRC scrambled with C-RNTI, then, in NR release 15, for example, there are 10 reserved bits available which can be used for GTS payload, as described herein. As used herein in one or more embodiments, reserved bits may generally refer to bits that have been reserved according to one or more existing wireless communication standards for future use and may therefore have no assigned function in the one or more existing wireless communication standards. The GTS payload can include, a bit or bit field indicating that this is a GTS signal. In case, the rest of the payload is zero, it means that the wireless device 22 can go to sleep, i.e., enter a sleep mode/state which may also corresponds to a non-monitoring time interval, after the scheduled PDSCH and the corresponding HARQ operation is finished. Therefore, in one or more embodiments, the GTS payload can include a bit or bit field indicating that the received DCI is a GTS-DCI, and possibly additional bits including some commands, where the reserved bits and/or bit field have been repurposed to provide new functionality such as a GTS indication, as elaborated later.

It is also possible for the network node 16 to send a GTS-DCI to the wireless device 22 without scheduling a PDSCH. Then, the network node 16 may send all zero bits for the frequency domain resource assignment of PDSCH, i.e., nothing is scheduled, so the wireless device 22 is able to determine that it should immediately go to sleep.

In these configurations, in other embodiments, the network node 16 can use other fields such as MCS indication to refer to invalid index indicating a go to sleep signal. That is, the network node 16 such as via one or more of processing circuitry 68, processor 70, radio interface 62, DCI unit 32, etc., may repurpose the MCS indication field to provide a GTS indication. In such an embodiment, the network node 16 such as via one or more of processing circuitry 68, processor 70, radio interface 62, DCI unit 32, etc., may send a payload bit pattern(s) that does not map to a valid scheduling configuration for the targeted wireless device 22, e.g. based on its reported capability, or contains mutually incompatible parameter settings, e.g., TBS, T/F allocation, and modulation combinations. For further improved reception robustness, the payload bit pattern may be a predetermined function of the C-RNTI, in order to increase signal space distance between GTSs targeting different wireless devices 22.

Alternatively or additionally, the network node 16 such as via one or more of processing circuitry 68, processor 70, radio interface 62, DCI unit 32, etc., may use the reserved bits to include possible additional commands or the lack of valid scheduling info.

In one or more other embodiments, the same approaches as described above can be applied in different sorts of RNTIs. Nevertheless, the size of the reserved bits can vary from one to another, e.g., for P-RNTI the number of reserved bits is 6. It is also possible to configure a (set of) wireless device(s) 22 with Go-to-sleep RNTI; in this case all fields of the DCI can be re-interpreted for the purpose of GTS signaling. The use of G-RNTI is efficient since such additional RNTI check may be performed with negligible additional complexity after decoding. C-RNTIs for one or more targeted wireless devices 22 may be accommodated in the re-defined payload field.

DCI Format 1-1:

In this case the DCI is always wireless device 22 specific, e.g., CRC scrambled with C-RNTI. Unlike the DCI format 1-0, DCI format 1-1 does not include explicit reserved bits. Nevertheless, within each bit field, there are reserved indexes (bit combinations) which can be used at least for indication of GTS-DCI, e.g., in all the antenna port indications, there is at least one reserved index which can be used to indicate a GTS. Nevertheless, since the number of such reserved indexes may depend on the configuration, the network node 16 network may or may not have sufficient bits to include additional commands.

In case the network node 16 and/or network does not have sufficient resources to include optional additional commands, the network node 16 such as via one or more of processing circuitry 68, processor 70, radio interface 62, DCI unit 32, etc. can send a GTS-DCI format 1-0 or other possible long GTS payload signals in the next PDCCH monitoring occasion. It is also possible to configure a (set of) wireless device(s) 22 with Go-to-sleep (GTS) RNTI; in this case all fields of the DCI can be re-interpreted for the purpose of GTS signaling DCI Format 0-0:

DCI format 0_0 is used for the scheduling of PUSCH in one cell. It can for example be configured to be wireless device 22 specific using C-RNTI.

As in the case of DCI format 1-1, this DCI does not have explicit reserved bits. However, there are a number of padding bits (in case the size of this DCI is less than DCI 1-0) which can be used for the purpose of GTS-DCI payload both for GTS indication and for the command part.

Nevertheless, this solution may not always be applicable, and thus one or more other embodiments can be followed. Within the MCS indication table, there are a number of reserved index rows which can be referred to by the DCI (i.e., by the GTS DCI) and as such the wireless device 22 knows that such indication refers to a GTS indication, since such an index would be considered an invalid index for indication of MCS. Another way to provide an indication of the GTS can be to leave all the bits within the time domain resource assignment as zero. In one embodiment, this indication of all the zero bits being zero, means the wireless device 22 such as via one or more of processing circuitry 68, processor 70, radio interface 62, DCI unit 32, etc., can go to sleep, i.e., cause the wireless device 22 to enter a sleep state/mode, after the scheduled PUSCH or a specified time after the PUSCH to give the network node 16 the possibility to request a re-transmission of the PUSCH.

In another embodiment, other reserved indexes, e.g., other reserved index rows of MCS can be used for referring to the commands or a partial set of the commands.

DCI Format 0-1:

DCI format 0-1 is used for the scheduling of PUSCH in one cell. This DCI is configured to be wireless device 22 specific.

As the case of DCI format 0-0, in DCI format 0-1 there are no explicit reserved bits. Nevertheless, within some of the indicator bits, e.g. MCS, precoding and antenna port, there are a number of reserved index rows which in the same way as described for DCI format 0-0 can be used for including the GTS-DCI payload, i.e., indication of GTS.

Additional Aspects:

A wireless device 22 such as via one or more of processing circuitry 68, processor 70, radio interface 62, DCI unit 32, etc., may monitor a number of UL and/or DL DCIs at the same time, and hence, the network node 16 can use any of them or a combination of them for including the GTS-DCI payload.

In another embodiment of using the current DCI formats for GTS-DCI, in case the GTS-DCI payload cannot be included in the current/existing formats regularly, other bits, e.g., the current scheduling bits, can be used to indicate the commands or a partial set of them for the GTS (in this case the DCI format does not include an actual scheduling component). In this case an indication to an invalid index row, such as an MCS reserved row can allow the wireless device to determine that the scheduling bits are actually used for commands.

A New DCI Format for GTS-DCI:

In case, the network node 16 prefers, e.g., the GTS-DCI payload cannot be included within the existing DCI formats, an independent GTS-DCI can be sent to the wireless device 22 within any of the PDCCH monitoring instances.

In this case, the GTS-DCI can address a specific wireless device 22 (e.g., using a GTS-RNTI), or a group of wireless devices 22 (e.g., a GTSG-RNTI). The remaining bits can then be used to indicate the GTS, and commands. In any case, it may be preferred if the size of the DCI does not go beyond the current DCI sizes.

Additional Information Conveyed in GTS

The above examples focus on GTS signaling that signals immediate sleep or sleep after current data package reception (or completed HARQ process for the current data package). Additional information may be provided in conjunction with GTS signaling, either using reserved bits or redefined payload bit patterns in existing DCI formats, and/or specified fields new DCI formats.

In one embodiment, GTS message bits or a part of them can also be used to indicate the wireless device 22 to go to sleep after a number of slots or after a specific time duration (this can also be conditioned on the last PDSCH that has been successfully received). This option may be used by the network node 16 if the DL buffer is empty but additional short-term transmission opportunities may be required before the wireless device 22 sleeps, i.e., enters a sleep state/mode.

In one embodiment, the GTS message bits can also be used to configure the duration of the sleep time before returning to monitoring the PDCCH according to the current C-DRX configuration, given, e.g., in terms of slots, frames, or C-DRX periods.

In one embodiment, the GTS message bits may be used to reconfigure the C-DRX configurations.

In one embodiment, if the network node 16 such as via one or more of processing circuitry 68, processor 70, radio interface 62, DCI unit 32, etc., determines that additional information can be significantly large in payload size or for the purpose of establishing a robust link, the GTS-DCI can also trigger a PDSCH transmission that carries the additional information payload. After reception of the additional information payload and sending an acknowledgment (ACK), the wireless device 22 can go to sleep, i.e., enter a sleep state/mode, as dictated by the command in the PDSCH. This approach can also be combined with the existing DRX Command MAC CE which sends the wireless device 22 to sleep directly either during an ON duration or inactivity timer, i.e., in addition to MAC CE command, the network node 16 includes additional information or commands within PDSCH, e.g., C-DRX reconfiguration, GTS delay and so on.

In another embodiment, the GTS-DCI can be used to indicate the wireless device 22 to skip a number of PDCCH monitoring occasions if the network node 16 does not intend to schedule something, e.g., data and/or signaling, for the wireless device 22.

Therefore, the disclosure advantageously provides a detailed design of a GTS-DCI payload indicating a go to sleep (GTS) signal to the wireless device at the DCI level, and further including optional additional information or commands.

SOME EXAMPLES

Example A1. A network node 16 configured to communicate with a wireless device 22 (WD 22), the network node 16 configured to, and/or comprising a radio interface 62 and/or comprising processing circuitry 68 configured to:

configure downlink control information, DCI, to indicate for the wireless device 22 to enter a discontinuous reception, DRX, mode based at least in part on a DCI format; and optionally transmit the DCI to the wireless device 22.

Example A2. The network node 16 of Example A1, wherein the configured DCI is a go to sleep DCI (GTS-DCI) that is uses one of a reserved bit field associated with the GTS-DCI, a reserved index associated with the GTS-DCI and a padding bits associated with the GTS- DCI to provide the indication.

Example A3. The network node 16 of Example A1, wherein the DCI is further configured to provide information associated with at least one of a DRX duration and DRX initiation timing.

Example B1. A method implemented in a network node 16 that is configured to communicate with a wireless device 22, the method comprising:

configuring downlink control information, DCI, to indicate for the wireless device 22 to enter a discontinuous reception, DRX, mode based at least in part on a DCI format; and optionally transmitting the DCI to the wireless device 22.

Example B2. The method of Example B1, wherein the configured DCI is a go to sleep DCI (GTS-DCI) that is uses one of a reserved bit field associated with the GTS-DCI, a reserved index associated with the GTS-DCI and a padding bits associated with the GTS- DCI to provide the indication.

Example B3. The method of Example B1, wherein the DCI is further configured to provide information associated with at least one of a DRX duration and DRX initiation timing.

Example C1. A wireless device 22 (WD 22) configured to communicate with a network node 16, the WD 22 configured to, and/or comprising a radio interface 82 and/or processing circuitry 84 configured to:

determine a downlink control information, DCI, indicates for the wireless device 22 to enter a discontinuous reception, DRX, mode based at least in part on a DCI format; and optionally initiate the DRX mode based at least in part on the DCI.

Example C2. The WD 22 of Example C1, wherein the DCI is a go to sleep DCI (GTS-DCI) that is uses one of a reserved bit field associated with the GTS-DCI, a reserved index associated with the GTS-DCI and a padding bits associated with the GTS- DCI to provide the indication.

Example C3. The WD 22 of Example C1, wherein the DCI is further configured to provide information associated with at least one of a DRX duration and DRX initiation timing.

Example D1. A method implemented in a wireless device 22, the method comprising:

determining a downlink control information, DCI, indicates for the wireless device 22 to enter a discontinuous reception, DRX, mode based at least in part on a DCI format; and optionally initiating the DRX mode based at least in part on the DCI.

Example D2. The method of Example D1, wherein the DCI is a go to sleep DCI (GTS-DCI) that is uses one of a reserved bit field associated with the GTS-DCI, a reserved index associated with the GTS-DCI and a padding bits associated with the GTS- DCI to provide the indication.

Example D3. The method of Example D1, wherein the DCI is further configured to provide information associated with at least one of a DRX duration and DRX initiation timing.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
Abbreviation Explanation
3GPP 3rd Generation Partnership Project
5G 5th Generation
BB Baseband
BW Bandwidth
C-DRX/CDRX Connected mode DRX (i.e. DRX in RRC_CONNECTED state)
CRC Cyclic Redundancy Check
DCI Downlink Control Information
DL Downlink
DRX Discontinuous Reception
gNB A radio base station in 5G/NR.
GTS Go to sleep
HARQ Hybrid Automatic Repeat Request
IoT Internet of Things
LO Local Oscillator
LTE Long Term Evolution
MAC Medium Access Control
MCS Modulation and Coding Scheme
mMTC massive MTC (referring to scenarios with ubiquitously deployed MTC devices)
ms millisecond
MTC Machine Type Communication
NB Narrowband
NB-IoT Narrowband Internet of Things
NR New Radio
NW Network
PDCCH Physical Downlink Control Channel
PDSCH Physical Downlink Shared Channel
RF Radio Frequency
RNTI Radio Network Temporary Identifier
RRC Radio Resource Control
RX Receiver/Reception
SSB Synchronization Signal Block
T/F Time/Frequency
TX Transmitter/Transmission
UE User Equipment
UL Uplink
WU Wake-up
WUG Wake-up Group
WUR Wake-up Radio/Wake-up Receiver
WUS Wake-up Signal/Wake-up Signaling It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:
1. A wireless device, comprising:
processing circuitry configured to:
receive, during an active time, downlink control information, DCI, having a predefined DCI format, the predefined DCI format including at least one bit indicating that the DCI includes a go-to-sleep, GTS, indication;
in response to receiving the DCI, cause the wireless device to skip a quantity of physical downlink control channel, PDCCH, monitoring occasions; and
cause the wireless device to enter a sleep state based at least in part on the GTS indication.

2. The wireless device of claim 1, wherein the DCI further indicates for the wireless device to enter the sleep state one of after an indicated quantity of slots and after an indicated time duration.

3. The wireless device of claim 1, wherein the processing circuitry is further configured to, in response to receiving the DCI, reconfigure at least one connected discontinuous reception, C-DRX, configuration.

4. The wireless device of claim 1, wherein the processing circuitry is further configured to, in response to receiving the DCI, trigger reception of a physical downlink shared channel, PDSCH, transmission that includes additional information for configuring the sleep state.

5. The wireless device of claim 4, wherein the processing circuitry is further configured to, in response to receiving the DCI, cause the wireless device to enter the sleep state after the additional information has been received.

6. A method implemented by a wireless device, the method comprising:
receiving, during an active time, downlink control information, DCI, having a predefined DCI format, the predefined DCI format including at least one bit indicating that the DCI includes a go-to-sleep, GTS, indication;
in response to receiving the DCI, skipping a quantity of physical downlink control channel, PDCCH, monitoring occasions; and
causing the wireless device to enter a sleep state based at least in part on the GTS indication.

7. The method of claim 6, wherein the DCI further indicates for the wireless device to enter the sleep state one of after an indicated quantity of slots and after an indicated time duration.

8. The method of claim 6, further comprising, in response to receiving the DCI, reconfiguring at least one connected discontinuous reception, C-DRX, configuration.

9. The method of claim 6, further comprising, in response to receiving the DCI, triggering reception of a physical downlink shared channel, PDSCH, transmission that includes additional information for configuring the sleep state.

10. The method of claim 9, further comprising, in response to receiving the DCI, causing the wireless device to enter the sleep state after the additional information has been received.

11. A network node, comprising:
processing circuitry configured to:
configure downlink control information, DCI, having a predefined DCI format, the predefined DCI format including at least one bit indicating that the DCI includes a go-to-sleep, GTS, indication configured to be received by a wireless device during an active time and to cause the wireless device to enter a sleep state;
configure the DCI to cause the wireless device to skip a quantity of physical downlink control channel, PDCCH, monitoring occasions; and
cause transmission of the DCI to the wireless device.

12. The network node of claim 11, wherein the processing circuitry is further configured to configure the DCI to cause the wireless device to enter the sleep state one of after an indicated quantity of slots and after an indicated time duration.

13. The network node of claim 11, wherein the processing circuitry is further configured to configure the DCI to cause the wireless device to reconfigure at least one a connected discontinuous reception, C-DRX, configuration of the wireless device.

14. The network node of claim 11, wherein the processing circuitry is further configured to cause a physical downlink shared channel, PDSCH, transmission that includes additional information for the wireless device to configure the sleep state.

15. The network node of claim 14, wherein the processing circuitry is configured to configure the DCI to cause the wireless device to enter the sleep state after the additional information has been received.

16. A method implemented by a network node, the method comprising:
configuring downlink control information, DCI, having a predefined DCI format, the predefined DCI format including at least one bit indicating that the DCI includes a go-to-sleep, GTS, indication configured to be received by the wireless device during an active time and to cause the wireless device to enter a sleep state;
configuring the DCI including configuring the DCI to cause the wireless device to skip a quantity of physical downlink control channel, PDCCH, monitoring occasions; and
causing transmission of the DCI to the wireless device.

17. The method of claim 16, wherein configuring the DCI further comprises configuring the DCI to cause the wireless device to enter the sleep state one of after an indicated quantity of slots and after an indicated time duration.

18. The method of claim 16, wherein configuring the DCI further comprises configuring the DCI to cause the wireless device to reconfigure at least one connected discontinuous reception, C-DRX, configuration of the wireless device.

19. The method of claim 16, further comprising causing a physical downlink shared channel, PDSCH, transmission that includes additional information for the wireless device to configure the sleep state.

20. The method of claim 19, wherein configuring the DCI comprises configuring the DCI to cause the wireless device to enter the sleep state after the additional information has been received.

* * * * *